J. A. WHITE.
QUICK DETACHABLE COUPLING.
APPLICATION FILED NOV. 30, 1921.

1,428,408.

Patented Sept. 5, 1922.

INVENTOR
J. A. White.
BY
Ackerson Totten,
ATTORNEYS

Patented Sept. 5, 1922.

1,428,408

UNITED STATES PATENT OFFICE.

JOHN A. WHITE, OF SAN FRANCISCO, CALIFORNIA.

QUICK-DETACHABLE COUPLING.

Application filed November 30, 1921. Serial No. 518,974.

*To all whom it may concern:*

Be it known that I, JOHN A. WHITE, a citizen of the United States, residing at the city and county of San Francisco and State of California, have invented certain new and useful Improvement in Quick-Detachable Couplings, of which the following is a specification.

The present invention relates to quick-detachable couplings for securing rotary objects, such for example as brushes, to shafts.

The object of the invention is to provide a simple and easily operated coupling of the described type, by means of which the object may be instantly applied to or removed from the shaft, and which will hold the object securely and firmly when applied to said shaft.

In its preferred embodiment, as herein described and illustrated, the invention is applied to the brush of a shoe-shining machine. It is particularly well adapted for such use, for the reason that it permits the removal and replacement of the brush without loss of time. It is to be understood, however, that the invention is not limited to such use, but may be equally well employed in any situation where a quickly detachable shaft coupling is desired. Moreover, although the invention is herein illustrated and described in its preferred form, it is to be understood that changes, within the scope of the claims hereto appended, may be made in the form and construction of the device without departing in any manner from the spirit of the invention.

With this in view the invention will now be fully described with reference to the accompanying drawings, wherein—

Figure 3:
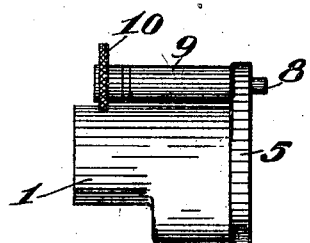
Fig. 3 is a side elevation of the driving member of the coupling.

In the drawings, the reference numeral 1 designates the driving member of my coupling, and 2 is the driven member. Said driving member 1 is preferably provided with a central bore 3 and a set-screw 4 for securing it upon the end of a driving shaft, not shown. It is also provided with a flange 5, in which are two diametrically opposite arcuate slots 6, said slots being widened at one end to form circular apertures 7. At one side of said flange 5, approximately midway between the slots 6, is a locking pin 8, slidably mounted within a supporting tube 9, and provided with an exterior knob 10 by which it may be grasped. A spring 11 surrounds the locking pin 8 within said tube 9, and normally holds said pin in the position shown in Figs. 2 and 3. A counter weight 12 is provided upon the driving member 1 opposite the locking pin 8 to balance the weight thereof.

Figure 1:
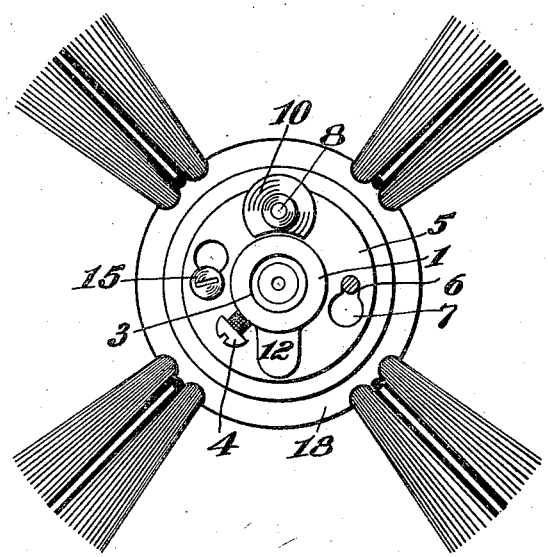
Fig. 1 is an end elevation of my coupling as applied to a rotary brush.
Figure 2:
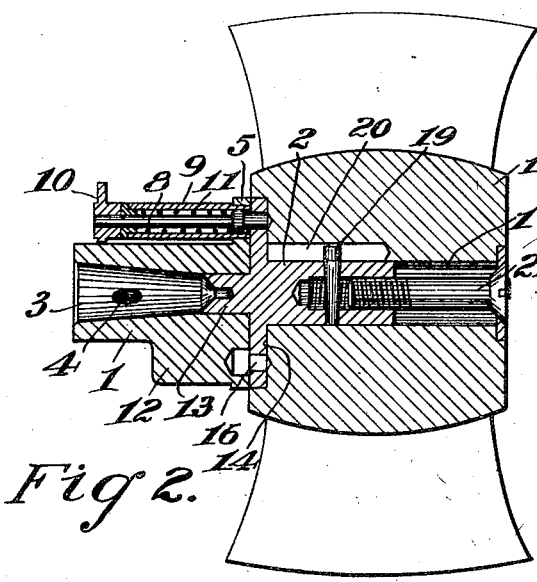
Fig. 2 is a central vertical section of the same.
Figure 4:
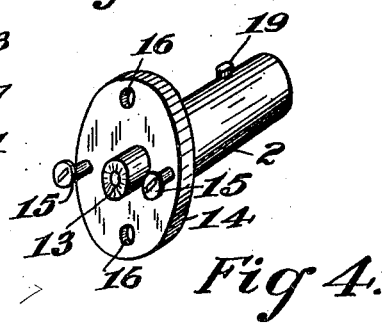
Fig. 4 is a perspective view of the driven member removed from the brush.

The driven member 2 has a central projecting stud 13 adapted to enter the end portion of the bore 3 of the driving member 1 for the purpose of centering the two members of the coupling. Said driven member 2 also has a flange 14 adapted to lie adjacent to the flange 5 of the driving member 1. Said flange 14 is provided with two opposite pins or screws 15 with enlarged heads, which are adapted to pass through and lock within the arcuate slots 6 of the driving member, as shown in Figs. 1 and 2. Said flange 14 is also provided with two oppositely disposed holes 16, into either of which the locking pin 8 may seat itself, as shown in Fig. 2. The driven member 2 is thus held from endwise movement away from the driving member 1 by the pins 15, and is prevented by the locking pin 8 from rotating to the position in which said pins 15 are free to pass through the enlarged portion 7 of the slots 6.

The driven member 2 lies within a central bore 17 in the hub of the brush 18, as shown in Fig. 2. A transverse pin 19 projects from said driven member and lies within an interior groove 20 in said brush to prevent the latter from turning upon said driven member. A screw 21 holds said driven member 2 securely within the hub of said brush.

To disengage the coupling and remove the brush, it is only necessary to withdraw the locking pin 8 and rotate the brush and the driven member 2 sufficiently to enable the heads of the pins 15 to pass through the enlarged end portions 7 of the arcuate slots 6. To engage the coupling and replace the brush, the central stud 13 of the driven member 2 is placed within the central bore 3 of the driving member 1, thereby mutually centering the two members. The driven member is then forced in against the action of the spring 11, its pins 15 passing through the enlarged portions 7 of the slots 6, and finally rotated sufficiently to cause said pins 15 to lock within said slots 6, and the locking pin 8 to drop into one of the holes 16.

Inasmuch as there are two of said holes 16, oppositely disposed, the driven member may be applied to the driving member in either of two positions, 180 degrees apart.

I claim:—

1. A separable coupling for rotary objects comprising a driving member having a central bore and a flange, a driven member having a central stud adapted to enter the bore of said driving member and a flange adapted to lie adjacent to the flange of said driving member, means actuated by a relative rotary movement between said members for connecting said flanges together to prevent endwise separation of said members, and a movable latch carried by the flange of one member and adapted to engage the flange of the other member to prevent said relative rotary movement.

2. A separable coupling for rotary objects comprising a driving member having a flange, a driven member having a flange adapted to lie adjacent to the flange of said driving member and a body portion adapted to lie within the object to be driven, a screw associated with said body portion and extending through said object to clamp the same against the flange of said driven member, means actuated by a relative rotary movement between said members for connecting said flanges together to prevent endwise separation of said members, and a movable latch carried by the flange of one member and adapted to engage the flange of the other member to prevent said relative rotary movement.

3. A separable coupling for rotary objects comprising a driving member having a flange, a driven member having a flange adapted to lie adjacent to the flange of said driving member and a body portion adapted to lie within the object to be driven, a pin projecting laterally from said body portion and adapted to engage said object to prevent its rotation upon said driven member, a screw associated with said body portion and extending through said object to clamp the same against the flange of said driven member, means actuated by a relative rotary movement between said members for connecting said flanges together to prevent endwise separation of said members, and a movable latch carried by the flange of one member and adapted to engage the flange of the other member to prevent said relative rotary movement.

4. A separable coupling for rotary objects comprising a driving member having a central bore and a flange, a driven member having a central stud adapted to enter the bore of said driving member and a flange adapted to lie adjacent to the flange of said driving member, a body portion formed upon said driven member and adapted to lie within the object to be driven, a screw associated with said body portion and extending through said object to clamp the same against the flange of said driven member, means actuated by a relative rotary movement between said members for connecting said flanges together to prevent endwise separation of said members, and a movable latch carried by the flange of one member and adapted to engage the flange of the other member to prevent said relative rotary movement.

5. A separable coupling for rotary objects comprising a driving member having a central bore and a flange, a driven member having a central stud adapted to enter the bore of said driving member and a flange adapted to lie adjacent to the flange of said driving member, a body portion formed upon said driven member and adapted to lie within the object to be driven, a pin projecting laterally from said body portion and adapted to engage said object to prevent its rotation upon said driven member, a screw associated with said body portion and extending through said object to clamp the same against the flange of said driven member, means actuated by a relative rotary movement between said members for connecting said flanges together to prevent endwise separation of said members, and a movable latch carried by the flange of one member and adapted to engage the flange of the other member to prevent said relative rotary movement.

In testimony whereof I have signed my name to this specification.

JOHN A. WHITE.